March 20, 1962 F. W. KARASEK 3,026,184
SULFUR PRODUCTION
Filed Sept. 26, 1957 2 Sheets-Sheet 1
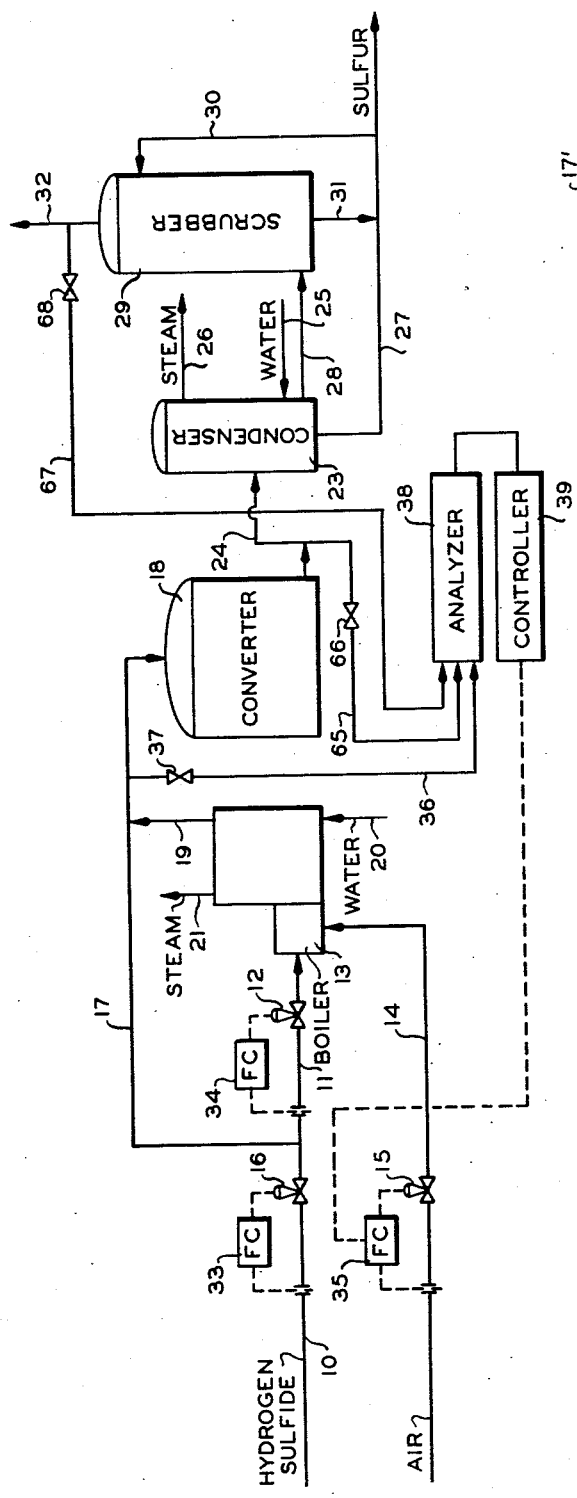
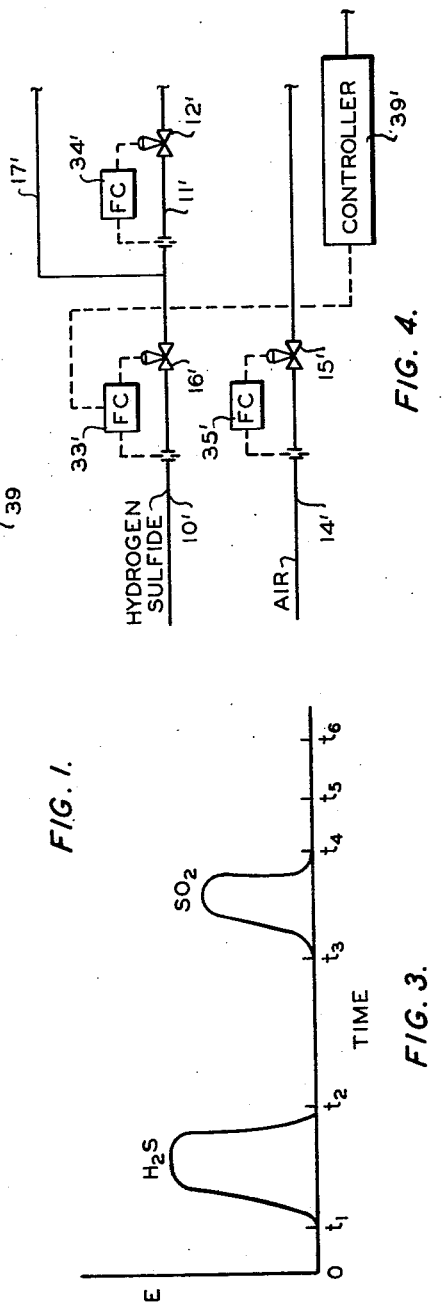
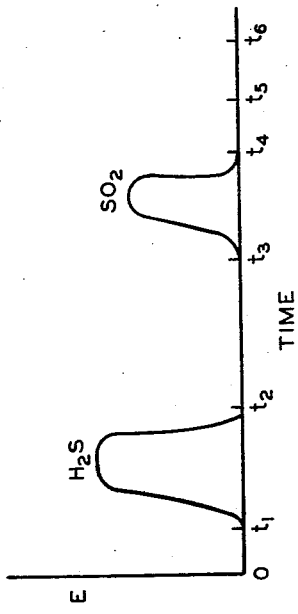
INVENTOR.
F. W. KARASEK
BY Hudson & Young
ATTORNEYS

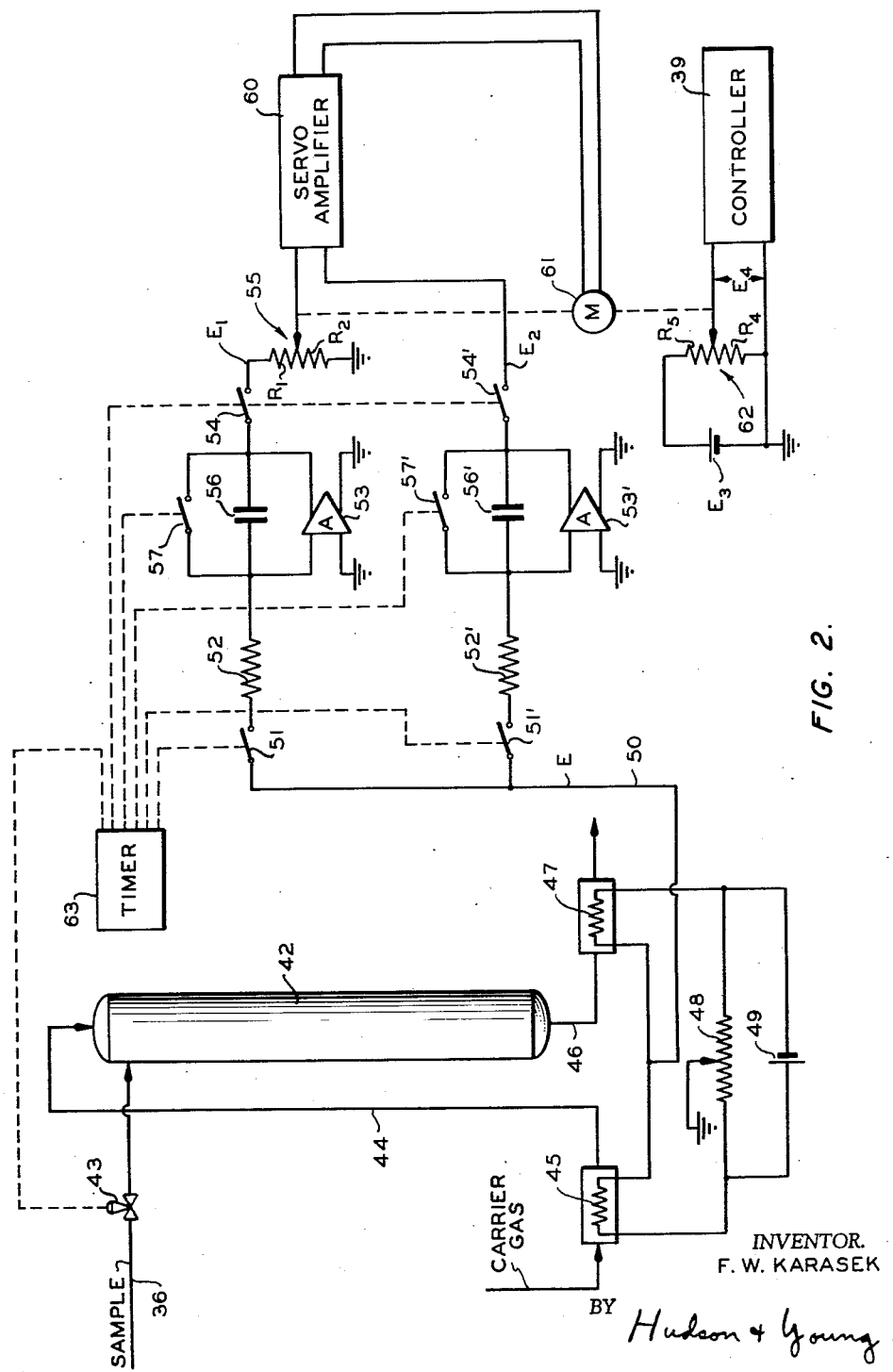

United States Patent Office 3,026,184
Patented Mar. 20, 1962

3,026,184
SULFUR PRODUCTION
Francis W. Karasek, Bartlesville, Okla., assignor to Phillips Petroleum Company, a corporation of Delaware
Filed Sept. 26, 1957, Ser. No. 686,348
12 Claims. (Cl. 23—255)

This invention relates to the production of sulfur from hydrogen sulfide.

The recovery of sulfur from gaseous streams containing hydrogen sulfide has become a valuable procedure in the gas and petroleum industries. Such an operation results in both the recovery of valuable sulfur and in a reduction of atmospheric pollution. The sulfur generally is produced by a process which involves the following two reactions:

$$2H_2S + 3O_2 \rightarrow 2H_2O + 2SO_2$$
$$2SO_2 + 4H_2S \rightarrow 4H_2O + 6S$$

The first reaction generally takes place in the combustion chamber of a boiler. Since this reaction is highly exothermic, the substantial amount of heat which is liberated is recovered in the form of steam production. One-third of the source hydrogen sulfide is combined with air to form sulfur dioxide in this reaction. The remainder of the hydrogen sulfide is combined with the reaction products from the combustion chamber, and the resulting mixture is passed through a catalyst-containing converter to carry out the second reaction. The effluent from the converter is cooled, and a portion of the sulfur product is recovered as a liquid. The non-condensed material is passed to a scrubber where it is contacted by liquid sulfur. This results in the recovery of additional sulfur.

In sulfur producing operations of this type it is difficult to maintain the desired ratios between the several gaseous streams to be reacted. This difficulty is due to a large extent in variations in composition of the hydrogen sulfide containing gas which comprises the feed to the sulfur producing operation. Heretofore, it has been extremely difficult to control such producing operations so as to prevent sulfur containing gases from being vented from the scrubbers.

In accordance with the present invention, an improved control system is provided wherein a sample is removed from a selected region of the process and analyzed to determine the ratio of hydrogen sulfide to sulfur dioxide. The relative flows of the reactant streams are controlled in response to the analysis so as to combine the proper amounts of the reactants. This procedure is capable of increasing substantially the amount of sulfur which can be recovered from a gaseous stream containing hydrogen sulfide.

Accordingly, it is an object of this invention to provide an improved process for increasing the production of sulfur from gaseous streams containing hydrogen sulfide.

Another object is to provide an improved process for removing sulfur containing gases from gaseous streams.

A further object is to provide an improved control system for sulfur producing operations.

Other objects, advantages and features of the invention should become apparent from the following detailed description which is taken in conjunction with the accompanying drawing in which:

FIGURE 1 is a schematic representation of a sulfur producing operation having a first embodiment of the control system of this invention incorporated therein.

FIGURE 2 is a schematic drawing of the control system of this invention.

FIGURE 3 is a graphical representation of an operating feature of the analyzer employed in the control system of FIGURE 2.

FIGURE 4 is a schematic representation of a second embodiment of the control system of this invention.

Referring now to the drawing in detail, and to FIGURE 1 in particular, a gaseous stream containing hydrogen sulfide is introduced into the system through a conduit 10. A conduit 11, having a control valve 12 therein, communicates between conduit 10 and the combustion chamber of a boiler 13. Air is supplied to the combustion chamber of boiler 13 through a conduit 14 which has a control valve 15 therein. A branch conduit 17 communicates between conduit 10 and the inlet of a converter 18. Converter 18 contains a bed of catalyst, such as bauxite. The outlet of the combustion chamber of boiler 13 communicates with conduit 17 through a conduit 19. Water is introduced into boiler 13 through a conduit 20, and the resulting steam is removed through a conduit 21.

The outlet of converter 18 is connected to the inlet of a condenser 23 by a conduit 24. Cooling water is introduced into condenser 23 through a conduit 25, and the resulting steam is removed through a conduit 26. Liquefied sulfur is removed from condenser 23 through a conduit 27. The non-condensed gases are removed from condenser 23 through a conduit 28 which communicates with a scrubber 29. A portion of the liquefied sulfur is sprayed into the top of scrubber 29 from a conduit 30 which communicates with conduit 27. The flue gas, from which sulfur has been scrubbed, is removed from the system through a conduit 32. Sulfur is passed from scrubber 29 to conduit 27 through a conduit 31.

The flow of hydrogen sulfide containing gas through conduit 10 is maintained at a predetermined rate by means of a flow controller 33 which adjusts valve 16. The flow of this gas through conduit 11 is maintained at a predetermined rate by means of a flow controller 34 which adjusts valve 12. The flow of air through conduit 14 is regulated by a flow controller 35 which adjusts valve 15. A sample of the gas flowing through conduit 17 is removed through a conduit 36, which has a valve 37 therein, and directed to the inlet of an analyzer 38 which provides an output signal representative of the ratio of hydrogen sulfide to sulfur dioxide in the sample stream. This signal is applied through a controller 39 to reset flow controller 35 to adjust the flow of air into furnace 13. If the measured ratio of hydrogen sulfide to sulfur dioxide should increase above the desired value, additional air is supplied to furnace 13 so that a greater portion of the hydrogen sulfide is therein converted into sulfur dioxide. If the measured ratio should decrease, the flow of air through furnace 13 is decreased.

Analyzer 38 is illustrated in FIGURE 2. The sample removed from conduit 17 is directed through conduit 36 to the inlet of a packed column 42. A control valve 43 is disposed in conduit 36. A carrier gas is introduced into column 42 by means of a conduit 44. A thermal conductivity cell, which has a temperature sensitive element 45 therein, is mounted in inlet conduit 44. The effluent from column 42 is removed through a conduit 46 which has a second temperature sensitive resistance element 47 therein. Resistance elements 45 and 47 are connected in series relationship to form two adjacent arms of a bridge network. A potentiometer 48 forms the opposite two arms of the bridge network. A voltage source 49 is connected across the end terminals of potentiometer 48. The contactor of potentiometer 48 is connected to ground, and the junction between resistance elements 45 and 47 is connected to an electrical lead 50 which provides an output signal of voltage E, taken with respect to ground.

Valve 43 is opened periodically by means of a timer 63 to introduce predetermined volumes of the sample gas into column 42. The carrier gas tends to force the sample through the column so that the effluent from the column begins to contain hydrogen sulfide at the end of a time $t_1$ and sulfur dioxide at the end of a time $t_3$. The output voltage E increases when these constituents appear in the effluent due to the difference in thermal conductivity of the gases flowing past resistance elements 45 and 47, as illustrated schematically in FIGURE 3.

Examples of suitable carrier gases which can be employed in this analyzer include: helium, hydrogen, nitrogen, argon, carbon dioxide, air and methane. The packing material in column 42 can be of the adsorbent type, such as charcoal, alumina, silica gel or a molecular sieve material. Liquid partition columns containing an inert solid coated by a solvent such as hexadecane, octyl sebacate or benzyl ether can also be employed.

Conductor 50 is connected through a switch 51 and a resistor 52 to the first input terminal of an operational amplifier 53, the second input terminal of amplifier 53 being connected to ground. The first output terminal of amplifier 53 is connected through a switch 54 and a potentiometer 55 to ground. A capacitor 56 is connected between the first input and output terminals of amplifier 53, and a switch 57 is connected in parallel with capacitor 56. Amplifier 53 is a conventional high-gain D.C. amplifier. When switch 57 is open, the output voltage $E_1$ of the amplifier is represented by the expression:

$$E_1 = \frac{1}{T}\int^t E\, dt$$

where $t$ is time and T is the time constant of capacitor 56 and its associated circuit. This circuit thus constitutes a first integration unit.

A second integration unit is also connected to lead 50. This second unit is similar to the one previously described and corresponding elements are designated by like primed reference numerals. The first output terminal of amlifier 53' is connected through switch 54' to the first input terminal of a servo amplifier 60, which can be of the type described in The Electronic Control Handbook, Batcher and Moulic, Caldwell-Clements, Inc., New York, 1946, page 298. The second input terminal of amplifier 60 is connected to the contactor of a potentiometer 55. The output of amplifier 60 energizes a reversible motor 61 which has the drive shaft thereof mechanically connected to the potentiometer of 55. The drive shaft of motor 61 is also mechanically connected to the contactor of a potentiometer 62 which has a voltage source $E_3$ connected across the end terminals thereof. The contactor and one end terminal of potentiometer 62 are connected to the respective input terminals of controller 39.

In order to describe the operation of the comparison circuit, the portions of potentiometer 55 above and below the contactor are designated as resistances $R_1$ and $R_2$, respectively. The portions of potentiometer 62 above and below the contactor are designated by resistances $R_5$ and $R_4$, respectively. The current flowing from the output of amplifier 53 through resistor $R_1$ and resistor $R_2$ to ground is designated $i_1$. The current flowing from the output of amplifier 53' through the input of amplifier 60 and resistor $R_2$ to ground is designated $i_2$. The following equations should thus become apparent:

$$E_1 = i_1(R_1+R_2) + i_2 R_2$$

$$E_2 = i_1 R_2 + i_2 R_2$$

The ratio can be expressed:

$$\frac{E_1}{E_2} = \frac{i_1(R_1+R_2)+i_2 R_2}{i_1 R_2 + i_2 R_2}$$

At null, $i_2 = 0$ so that:

$$\frac{E_1}{E_2} = \frac{R_1+R_2}{R_2} = \frac{R_4+R_5}{R_4} = \frac{E_3}{E_4}$$

This can be expressed:

$$E_4 = \frac{E_2(E_3)}{E_1} = k\frac{E_2}{E_1}$$

where $k$ is a constant.

The output voltage $E_4$ which is applied to controller 39 is thus representative of the ratio of the output signals from amplifiers 53 and 53'.

Switches 51, 51', 57, 57', 54 and 54' are operated by a timer 63 so that the output signals from amplifiers 53 and 53' represent the concentrations of hydrogen sulfide and sulfur dioxide, respectively, in the sample gas. Timer 63 can comprise a plurality of cams which are rotated by a constant speed motor. These cams operate the switches in the sequence described hereinafter. Switch 51 is closed at time $t_1$, see FIGURE 3. Switches 57 and 57' are open at this time. At time $t_2$ switch 51 is opened. At time $t_3$ switch 51' is closed. At time $t_4$ switch 51' is opened. At time $t_5$ switches 54 and 54' are closed so that the output signals of amplifiers 53 and 53' which are stored on respective capacitors 56 and 56' are applied to the comparison circuit. At time $t_6$ switches 57 and 57' are closed momentarily to discharge the capacitors and to prepare the unit for a subsequent analysis cycle.

Controller 39 can be any conventional commercially available unit which converts an input electrical voltage into a corresponding output pneumatic pressure. A transducer of this type is described in Bulletin A-710, the Swartwout Company, Cleveland, Ohio, for example. This pneumatic signal resets flow controller 35, which can be of the type described in Bulletin 5A-10A, The Foxboro Company, Foxboro, Massachusetts, for example.

There are several other points in the process of FIGURE 1 from which gas samples can be removed and directed to analyzer 38. For example, a sample can be removed from conduit 24 through a conduit 65 which has a valve 66 therein. A sample can also be removed from conduit 32 through a conduit 67 which has a valve 68 therein. Sample conduit 36 provides an indication of the ratio of hydrogen sulfide to sulfur dioxide supplied to converter 18. The other two sample points provide measurements of the ratio of any unreacted gases. If the system is operating properly, there should be little or no unreacted gases in the effluent from converter 18.

Typical operating conditions for a sulfur producing plant of the type described are set forth in the following table:

Conduit (Composition, Mol Percent)

| | 10 | 14 | 19 | 24 | 27 | 32 |
|---|---|---|---|---|---|---|
| $H_2S$ | 44.8 | | 1.81 | 1.3 | | 1.4 |
| $CO_2$ | 36.5 | | 9.26 | 17.1 | | 20.0 |
| $CH_4$ | 5.65 | | 0.15 | 1.7 | | 1.9 |
| $C_2H_6$ | 1.54 | | 0.04 | 0.5 | | 0.5 |
| $C_3H_8$ | 1.98 | | 0.05 | 0.6 | | 0.7 |
| $C_4H_{10}$ | 0.12 | | 0.01 | | | |
| $C_5^+$ | 0.02 | | | | | |
| $N_2$ | 2.90 | 76.9 | 64.15 | 50.0 | | 58.7 |
| $H_2O$ | 6.40 | 2.7 | 15.68 | 26.1 | | 16.0 |
| $O_2$ | | 20.4 | | | | |
| $SO_2$ | | | 8.87 | 0.7 | | 0.8 |
| S | | | | | 100 | |
| | | | | 2.0 | | |
| Temp., °F | 100 | 90 | 530 | 507 | 300 | 300 |
| P.s.i.g. | 4 | 5 | 2 | 0.6 | 0.4 | 0.1 |

In FIGURE 4 there is shown a second embodiment of the control system of this invention wherein elements corresponding to elements of FIGURE 1 are designated by like primed reference numerals. In the control system of FIGURE 4, controller 39' resets flow controller 33' instead of flow controller 35'. If the measured ratio of hydrogen sulfide to sulfur dioxide should increase, flow controller 33' is reset to decrease the flow of hydrogen sulfide through the system. Conversely, if the measured ratio should decrease, the flow of hydrogen sulfide is increased. The control system of FIGURE 4 is otherwise the same as that of FIGURE 1.

From the foregoing description it should be evident that there is provided in accordance with this invention an improved control system for a sulfur producing plant. This control system is of considerable value in sulfur producing operations because it results in both an increase in sulfur production and in a decrease in atmospheric pollution. The chromatographic analyzer described herein is particularly adapted for use in the control system. However, other types of analyzers, such as mass spectrometers, can also be employed.

While the invention has been described in conjunction with present preferred embodiments, it should be evident that it is not limited thereto.

What is claimed is:

1. In a system for the production of sulfur including first and second reactors, first conduit means to introduce a hydrogen sulfide containing gas, second conduit means communicating between said first conduit means and said first reactor to introduce gas therein, third conduit means communicating between said first conduit means and said second reactor to introduce gas therein, fourth conduit means communicating with said first reactor to introduce a free oxygen containing gas, fifth conduit means communicating between said first reactor and said third conduit means to pass the effluent from said reactor into contact with gas in said third conduit means, and sixth conduit means communicating with said second reactor to remove the effluent therefrom; a control system comprising means to withdraw a sample downstream from the junction of said fifth and third conduit means, means to analyze the withdrawn sample to establish a signal representative of the ratio of hydrogen sulfide to sulfur dioxide therein, and means responsive to said means to analyze to control the relative flows through said second and fourth conduit means, thereby to maintain the ratio of hydrogen sulfide to sulfur dioxide in said sample constant at a preselected value.

2. In a system for the production of sulfur including first and second reactors, first conduit means to introduce a hydrogen sulfide containing gas, second conduit means communicating between said first conduit means and said first reactor to introduce gas therein, third conduit means communicating between said first conduit means and said second reactor to introduce gas therein, fourth conduit means communicating with said first reactor to introduce a free oxygen containing gas, fifth conduit means communicating between said first reactor and said third conduit means to pass the effluent from said reactor into contact with gas in said third conduit means, and sixth conduit means communicating with said second reactor to remove the effluent therefrom; a control system comprising means to maintain a predetermined flow through said first conduit means, means to maintain a predetermined ratio of flows through said second and third conduit means, means to withdraw a sample downstream from the junction of said fifth and third conduit means, means to analyze the withdrawn sample to establish a signal representative of the ratio of hydrogen sulfide to sulfur dioxide therein, and means responsive to said means to analyze to control the flow through said fourth conduit means, thereby to maintain the ratio of hydrogen sulfide to sulfur dioxide in said sample constant at a preselected value.

3. In a system for the production of sulfur including first and second reactors, first conduit means to introduce a hydrogen sulfide containing gas, second conduit means communicating between said first conduit means and said first reactor to introduce gas therein, third conduit means communicating between said first conduit means and said second reactor to introduce gas therein, fourth conduit means communicating with said first reactor to introduce a free oxygen containing gas, fifth conduit means communicating between said first reactor and said third conduit means to pass the effluent from said reactor into contact with gas in said third conduit means, and sixth conduit means communicating with said second reactor to remove the effluent therefrom; a control system comprising means to maintain a predetermined flow through said second conduit means, means to maintain a predetermined flow through said fourth conduit means, means to withdraw a sample downstream from the junction of said fifth and third conduit means, means to analyze the withdrawn sample to establish a signal representative of the ratio of hydrogen sulfide to sulfur dioxide therein, and means responsive to said means to analyze to control the relative flows through said second and third conduit means, thereby to maintain the ratio of hydrogen sulfide to sulfur dioxide in said sample constant at a preselected value.

4. The control system of claim 1 wherein said means to analyze comprises a chromatographic analyzer adapted to provide output electrical signals representative of the constituents being detected, first and second means to integrate electrical signals, means to apply the output signals of said analyzer in sequence to said first and second means to integrate, and means to establish a signal representative of the ratio of the output signals of said first and second means to integrate.

5. The control system of claim 1 wherein said means to analyze comprises a column filled with a material which selectively retards passage therethrough of constituents of a fluid mixture, means to pass a carrier gas through said column, means to introduce a sample of the material to be analyzed into said column so as to be carried therethrough by said carrier gas, means to compare the temperatures of the carrier gas passed into and removed from said column and to establish an electrical signal representative thereof, first and second means to integrate electrical signals, means to apply said electrical signal in sequence to said means to integrate, and means to establish a signal representative of the ratio of the output signals of said first and second means to integrate.

6. The control system of claim 5 wherein said means to establish comprises a potentiometer, means to apply the output of one of said means to integrate across the end terminals of said potentiometer, means to compare the output of the other of said means to integrate with the potential between the contactor of said potentiometer and one end terminal thereof, and means responsive to said means to compare to adjust the contactor of said potentiometer until the voltages being compared are equal, the position of said contactor being representative of the ratio of the output signals of said first and second means to integrate.

7. In a sulfur producing system including a combustion chamber, first conduit means to introduce a hydrogen sulfide containing gas into the system, second conduit means communicating between said first conduit means and said combustion chamber, a converter, third conduit means communicaing between said first conduit means and said converter, fourth conduit means communicating with said combusition chamber to introduce an oxygen containing gas, fifth conduit means communicating between the outlet of said combustion chamber and said third conduit means, a liquid-gas separator, sixth conduit means communicating between the outlet of said converter and the inlet of said separator, seventh conduit means communicating with an outlet of said separator to remove gases, and eighth conduit means communicating with an outlet of said separator to remove liquid sulfur; a control system comprising means to withdraw a sample stream from the system at a point downstream from the junction of said fifth and third conduit means, means to analyze the sample stream and to establish a signal representative of the ratio of hydrogen sulfide to sulfur dioxide, and means responsive to said means to analyze to control the relative flows through said second and fourth conduit means, thereby to maintain the ratio of hydrogen sulfide to sulfur dioxide in said sample stream constant at a preselected value.

8. The control system of claim 7 wherein said means to withdraw a sample stream communicates with said seventh conduit means.

9. The control system of claim 7 wherein said means to withdraw a sample stream communicates with said sixth conduit means.

10. The control system of claim 7 wherein said means to withdraw a sample stream communicates with said fifth conduit means downstream from the junction with said third conduit means.

11. In a sulfur producing system including a combustion chamber, first conduit means to introduce a hydrogen sulfide containing gas into the system, second conduit means communicating between said first conduit means and said combustion chamber, a converter, third conduit means communicating between said first conduit means and said converter, fourth conduit means communicating with said combustion chamber to introduce an oxygen containing gas, fifth conduit means communicating between the outlet of said combustion chamber and said third conduit means, a liquid-gas separator, sixth conduit means communicating between the outlet of said converter and the inlet of said separator, seventh conduit means communicating with an outlet of said separator to remove gases, and eighth conduit means communicating with an outlet of said separator to remove liquid sulfur; a control system comprising means to withdraw a sample stream from the system at a point downstream from the junction of said fifth and third conduit means, a chromatographic analyzer adapted to provide output electrical signals representative of the constituents to be detected, means to introduce the sample stream into said analyzer, first and second means to integrate electrical signals, means to apply the output signals of said analyzer, which are representative of the concentrations of hydrogen sulfide and sulfur dioxide, respectively, in sequence to said first and second means to integrate, means to establish a control signal representative of the ratio of the output signals of said first and second means to integrate, and means responsive to said control signal to regulate the relative flows through said second and fourth conduit means, thereby to maintain the ratio of hydrogen sulfide to sulfur dioxide in said sample stream constant at a preselected value.

12. Apparatus for establishing a signal representative of the ratio of two constituents of a fluid mixture comprising a column filled with a material which selectively retards passage therethrough of constituents of a fluid mixture; means to pass a carrier gas through said column; means to introduce a sample of the material to be analyzed into said column so as to be carried therethrough by said carrier gas; means to compare the temperatures of the carrier gas passed into and removed from said column and to establish an electrical signal representative thereof; first and second means to integrate electrical signals; means to apply said electrical signal in sequence to said means to integrate; and means to establish a signal representative of the ratio of the output signals of said first and second means to integrate comprising a potentiometer, means to apply the output of one of said means to integrate across the end terminals of said potentiometer, means to compare the output of the other of said means to integrate with the potential between the contactor of said potentiometer and one end terminal thereof, and means responsive to said means to compare to adjust the contactor of said potentiometer until the voltages being compared are equal, the position of said contactor being representative of the ratio of the output signals of said first and second means to integrate.

References Cited in the file of this patent

UNITED STATES PATENTS

| | | |
|---|---|---|
| 2,650,154 | Anderson | Aug. 25, 1953 |
| 2,694,923 | Carpenter | Nov. 23, 1954 |
| 2,702,238 | Hays | Feb. 15, 1955 |
| 2,813,010 | Hutchins | Nov. 12, 1957 |
| 2,826,908 | Skarstrom | Mar. 18, 1958 |